United States Patent [19]

Saito

[11] 4,055,542

[45] * Oct. 25, 1977

[54] ANAEROBICALLY CURABLE SEALING COMPOSITION CONTAINING (A) ACRYLATE DERIVATIVE OF BISPHENOL A AND (B) HYDROXYACRYLATE

[75] Inventor: Tsutomu Saito, Hachioji, Japan

[73] Assignee: Three Bond Co., Ltd., Tokyo, Japan

[ * ] Notice: The portion of the term of this patent subsequent to June 17, 1992, has been disclaimed.

[21] Appl. No.: 660,435

[22] Filed: Feb. 23, 1976

[30] Foreign Application Priority Data

Feb. 24, 1975 Japan ................................. 50-22663

[51] Int. Cl.$^2$ .......................... C08F 3/62; C08F 3/64
[52] U.S. Cl. .............................. 260/47 UA; 156/332; 526/204; 526/230; 526/320
[58] Field of Search .................................. 260/47 UA

[56] References Cited

U.S. PATENT DOCUMENTS

| | | | |
|---|---|---|---|
| 2,895,950 | 7/1959 | Krieble | 260/89.5 |
| 3,041,322 | 6/1962 | Krieble | 260/89.5 |
| 3,043,820 | 7/1962 | Krieble | 260/89.5 |
| 3,046,262 | 7/1962 | Krieble | 260/89.5 |
| 3,218,305 | 11/1965 | Krieble | 260/89.5 |
| 3,300,547 | 1/1967 | Gorman | 260/885 |
| 3,419,512 | 12/1968 | Lees et al. | 260/29.7 |
| 3,435,012 | 3/1969 | Nordlander | 260/88.3 |
| 3,890,273 | 6/1975 | Saito | 260/47 UA |

Primary Examiner—Herbert J. Lilling
Attorney, Agent, or Firm—Donald D. Mon

[57] ABSTRACT

An anaerobically curable sealing composition comprising a polymerizable monomer and an organic peroxide, characterized in that said monomer is a mixture of bisphenol type compound (A) and hydroxy type compound (B), the amount ratio of said (A) and (B) being;

A: 95 to 50 parts by weight,
B: 50 to 5 parts by weight, whereby providing to the composition many kinds of excellent characteristics, such as being speedy in curing rate, greater in adhesive force, etc..

8 Claims, No Drawings

ANAEROBICALLY CURABLE SEALING COMPOSITION CONTAINING (A) ACRYLATE DERIVATIVE OF BISPHENOL A AND (B) HYDROXYACRYLATE

BACKGROUND OF THE INVENTION

The present invention relates to an anaerobically curable sealing composition having many kinds of excellent characteristics, such as being speedy in curing rate, greater in adhesive force, etc.

The anaerobically curable sealing composition is meant as an adhesive composition which will not cure and will be kept in liquid state as long as it remains in contact with air or oxygen, while rapidly curing under the exclusion of the air or oxygen, so that the composition is widely utilized as sealing materials, such as loosening prevention materials for bolts and nuts, adhesives for an engaged portion, and leak preventing materials for a liquid or gas having high pressure or high temperature.

This composition is reduced to practice for example, as loosening prevention material for bolts and nuts in such a manner as mentioned below. First of all, said composition is coated onto the screw parts of the bolt and nut (under this condition, the composition is kept in liquid state because of contacting with air), then, the bolt and nut are tightened, and as a result of which, the air is excluded from the screw part of the bolt and nut. The composition on the screw part is rapidly polymerized and cured by the exclusion of air to thereby prevent the loosening between the bolt and nut, and furthermore, perfectly seal the air gaps therebetween.

Various kinds of the composition have been known as an anaerobically curable sealing composition in the past. Some examples of the composition are designated as follows.

(1) An anerobically curable sealing adhesives comprising a mixture of a compound having a general formula of

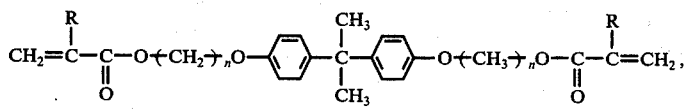

in which, R represents hydrogen, methyl or ethyl radical, and n represents an integer of from 1 to 8, and an organic peroxide (Japanese Pat. Publication No. 15640/1970).

However, said adhesives have disadvantages in that they are slow in curing rate, small in adhesive force. Especially, they give rise to an extreme decrease of curing rate to an inert surface, such as, zinc chromated surface, chromium plated surface etc. (Thus, in this case, a heat treatment is necessary for the curing).

(2) A composition of an anaerobically curable sealing adhesives containing a monomer of 2-hydroxyethyl methacrylate as its main ingredient.

This composition possesses preferable characteristics in that it is greater in adhesive force and speedy in curing rate. (because the monomer has OH radicals in the molecule.)

However, a polymer obtained by the anaerobic curing exhibits a thermal plasticity (because the monomer has only one functional group).

For the above reason, the uses of the composition are extremely decreased under the condition of the high temperature of more than about 80° C.

The polymer also exhibits hydrophilic property (because of OH radical in the molecule), and therefore, it becomes inferior in water proof property or weather proof property.

Furthermore, this composition is harmful to the skin of human body and causes an eruption.

SUMMARY OF THE INVENTION

Accordingly, a primary object of the invention is to provide an anaerobically curable sealing composition which is speedy in curing rate.

Another object of the invention is to provide an anerobically curable sealing composition which is greater in adhesive force.

A further object of the invention is to provide an anaerobically curable sealing composition which is also speedy in curing rate and greater in adhesive force even to an inert surface.

A still further object of the invention is to provide an anaerobically curable sealing composition which is excellent in water proof property and weather proof property, and further, is excellent in stability even when it is standing under the circumstance of a high temperature of more than 80° C.

A particular object of the invention is to provide an anaerobically curable sealing composition which is harmless to the skin of the human body.

The foregoing objects and other objects are achieved by the provision of an anaerobically curable sealing composition comprising a polymerisable monomer and an organic peroxide, characterized in that said monomer is a mixture of the following monomers (A) and (B), the ratio of the amounts of which are A. : 95 to 50 parts by weight,
B. : 50 to 5 parts by weight;
A. A monomer having a general formula of

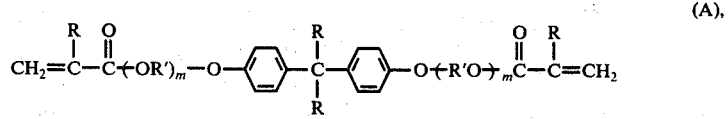

wherein, R represents hydrogen or alkyl radical having from 1 to 4 carbon atoms, R' represents alkylene radical having from 2 to 4 carbon atoms and m represents an integer of from 2 to 8.

B. A monomer having a general formula of

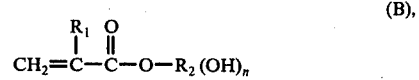

in which, $R_1$ indicates hydrogen or alkyl radical having from 1 to 4 carbon atoms, $R_2$ indicates $-CH_2-CH_3$, $-CH_2-CH_2-CH_3$ or

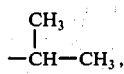

in each of said $R_2$, one or more hydrogens being released at arbitary positions to form one or more bonds for combining with OH radical and $n$ indicates an integer from 1 to 3.

These and other objects and advantages of this invention become more apparent and fully understood hereinafter detailed description.

DETAILED DESCRIPTION

The characterisitc feature of the present composition resides in, especially, using as a monomer, a mixture of the aforementioned monomers (A) and (B).

The amount ratio of said (A) and (B) is designated as;

Monomer (A) : 95 to 50 parts by weight, preferably 90 to 70 parts by weight,

Monomer (B) : 50 to 5 parts by weight, preferably 30 to 10 parts by weight.

The composition of this invention is formed by adding to the aforementioned mixture, an organic peroxide in an adequate amount, preferably in an amount of 0.3 to 3 parts by weight to 100 parts by weight of said mixture, thereby providing to the composition the aforementioned advantages.

When the monomer (A) is used in an amount over 95 parts by weight, and monomer (B) is used in an amount below 5 parts by weight, the composition obtained becomes decreased in curing rate and small in adhesive force, and especially, to an inert surface, it becomes extremely slow in curing rate and extremely small in adhesive force.

On the other hand, when the monomer (A) is used in an amount below 50 parts by weight, and the monomer (B) is used in an amount over 50 parts by weight, the polymer obtained becomes inferior in, both, water and weather proof properties, and furthermore, becomes extremely decreased in stability in the circumstance of a high temperature of more than 80° C.

Moreover, such composition becomes harmful and poisonous because of causing an eruption to the skin of a human body. Thus, the monomers (A) and (B) used in the present invention must be limited, respectively, in an amount of the aforementioned ranges.

Monomers having a general formula (A) mentioned above are: 2,2-bis (4-methacryloxy di-ethoxy phenyl) propane, 2,2-bis(4-methacryloxy tri-ethoxy phenyl) propane, 2,2-bis(4-methacryloxy tetraethoxy phenyl) propane, 2,2-bis(4-methacryloxy pentaethoxy phenyl) propane, 2,2-bis(4-methacryloxy hexa-ethoxy phenyl) propane, 2,2-bis(4-methacryloxy hepta-ethoxy phenyl) propane, 2,2-bis(4-methacryloxy octa-ethoxy phenyl) propane, 2,2-bis(4-methacryloxy di-propoxy phenyl) propane, 2,2-bis(4-methacryloxy tri-propoxy phenyl) propane, 2,2-bis(4-methacryloxy octa-propoxy phenyl) propane, 2,2-bis(4-methacryloxy di-butoxy phenyl) propane, 2,2-bis(4-methacryloxy tri-butoxy phenyl) propane, 2,2-bis(4-methacryloxy octa-butoxy phenyl) propane, 2,2-bis (4-acryloxy di-ethoxy phenyl) propane, 2,2-bis(4-acryloxy dibutoxy phenyl) propane, 2(4-methacryloxy di-ethoxy phenyl)-2 (4-methacryloxy tri-ethoxy phenyl) propane, 2(4-methacryloxy di-propoxy phenyl)-2(4-methzcryloxy tri-ethoxy phenyl) propane, 2,2-bis(4-α-ethylacryloxy di-ethoxy phenyl) propane, 2,2-bis (α-propylacryloxy di-ethoxy phenyl) propane, 2(4-α-ethylacryloxy di-ethoxy phenyl)-2(4-methacryloxy di-ethoxy phenyl) propane, etc.

Although it is better and preferable that the aforedesignated monomers are pure, it may be useful even with an industrial level containing very small amounts of inhibitors, stabilizers, etc.

Monomer (B) having a general formula mentioned above are: 2-hydroxy ethyl methacrylate, 1-hydroxyethyl methacrylate, 2-hydroxy-propyl methacrylate, 1-hydroxypropyl methacrylate, 1,2-di-hydroxyethyl methacrylate, 1,2,3-tri-hydroxypropyl methacrylate, 2-hydroxyacrylate, etc.

The organic peroxide used in the present invention acts as a polymerization initiator for the afore-designated monomer and are exemplified as: benzoyl peroxide, methyl ethyl keton peroxide, cyclohexanone peroxide, cumene hydroperoxide, ditertiary butyl peroxide, lauryl peroxide, di-cumyl peroxide, etc.

The composition of this invention may be prepared by mixing the above-mentioned monomers (A), (B), and organic peroxide to obtain a homogenous solution.

Furthermore, the present composition may be accomplished by adding to the solution a polymerization accelerator to accelerate polymerization or curing rate. The polymerization accelerator can be, for example, O-sulfobenzoic imide, 1,2,3,4-tetra-hydroquinoline or dextrin. The amounts thereof may be preferably added within a range of 0.2 to 2 parts by weight to 100 parts by weight of mixture of monomers, respectively.

Moreover, the present composition may contain an agent for increasing adhesive force, for example, may be added with acrylic acid in an amount of less than 3 parts by weight to 100 parts by weight of the mixture.

Following examples are designated to more easily understand the present invention. These examples are not for limiting the scope of the invention, but are merely for exemplifying the invention. In the example, all part(s) are meant by "part(s) by weight".

EXAMPLES 1 to 6

Following ingredients were prepared to obtain samples for tests.

Monomer (A): 2-2bis(4-methacryloxy diethoxy phenyl) propane; monomer (B): 2-hydroxy ethyl methacrylate; organic peroxide: cumene hydro-peroxide; polymerization accelerator: orthosulfobenzoic imide, 1,2,3,4-tetra-hydroquinoline and dextrin agent for increasing adhesive force: acrylic acid.

These ingredients were combined with each other in amounts designated on Table 1, mixed and dissolved to obtain samples 1 – 6.

All of these samples were liquid state. Among these samples, samples No. 3 to 6 were concerned with a composition of the present invention.

Table 1

| Ingredients | Sample No. | 1 | 2 | 3 | 4 | 5 | 6 |
|---|---|---|---|---|---|---|---|
| 2,2-bis(4-methacryloxy di-ethoxy phenyl) propane | | 100 | — | 90 | 80 | 60 | 70 |

Table 1-continued

| Ingredients | Sample No. | 1 | 2 | 3 | 4 | 5 | 6 |
|---|---|---|---|---|---|---|---|
| 2-hydroxyethyl methacrylate | | — | 100 | 10 | 20 | 40 | 30 |
| Cumene hydroperoxide | | 3 | 3 | 3 | 3 | 3 | 3 |
| O-sulfobenzoic imide | | 1 | 1 | 1 | 1 | 1 | 1 |
| 1,2,3,4-tetra-hydroquinoline | | 0.4 | 0.4 | 0.4 | 0.4 | 0.4 | 0.4 |
| Dexistrin | | 0.03 | 0.03 | 0.03 | 0.03 | 0.03 | 0.03 |
| Acrylicacid | | — | — | — | — | — | — |

[Tests for curing rate and adhesive force]

Each of said samples was coated on iron surface, zinc-cromated surface and cromium plated surface, respectively, and then, was measured with respect to curing rate and adhesive force. The results were designated on Table II.

The tests were respectively carried out by the steps designated below.

First of all, iron bolts and nuts (Fe-Fe), Zinc-cromated bolts and nuts (ZnCr-ZnCr) and cromium plated bolts and nuts (Cr-Cr) were prepared. (Each of these bolts was 10mm$\phi$ and 1.5 pitch of screw.)

Next, each of samples No. 1 to 6 (liquid) was coated on each screw part of the nuts, and then, the bolts were fixed into the coated nuts by fingers. (Return torques were zero at this time, respectively). The thus fixed bolts and nuts were left standing to cure for 30 minutes, 1 hour or 24 hours, respectively, under a room temperature (about 20° C).

Thereafter, the bolts were returned under a room temperature by using a torque range (produced by Tonichi Manufacturing Co., Ltd., Japan) to determine the values of return torque (kg-cm) at this time, and thereby to obtain curing rate and adhesive force, respectively. The results were indicated on Table II.

creased in case of inert surfaces of ZnCr-ZnCr and Cr-Cr.

On the other hand, all of these samples No. 2 to 6 (especially samples No. 3 to 6) indicate desirable values and are speedy in curing rate and greater in adhesive force, and they indicated good values to inert surfaces.

It becomes apparent from the above facts that sample No. 1 in which monomer (B) is contained, gives rise to decreased curing rate and adhesive force, and especially, in case of inert surfaces, it is extremely inferior with respect to both of curing rate and adhesive force.

[Tests for stability of polymer at high temperature]

Each sample was tested for stability of polymer under a condition of high temperature after being cured by polymerization. The results were designated on Table III.

The tests were carried out by using iron bolts and nuts (diameter of bolts: 10mm$\phi$, pitch: 1.5). First of all, each sample was coated on the screw parts of the nuts, then, the bolts were fixed into the nuts by fingers (Return torques are zero at this time, respectively). The thus fixed bolts and nuts were left standing for 24 hours at a normal room temperature (20° C). (for curing).

After that, said bolts were returned by the aforementioned same torque range under the high temperature Table II

| Time of being left standing (curing time) (room temperature 20° C) | Material of bolt-nut | Return torque (kg-cm) (room temperature 20° C) Sample No. | | | | | |
|---|---|---|---|---|---|---|---|
| | | 1 | 2 | 3 | 4 | 5 | 6 |
| 30 min. | Fe-Fe | 40 | 180 | 220 | 240 | 240 | 260 |
| | ZnCr-ZnCr | 0 | 40 | 60 | 90 | 80 | 90 |
| | Cr-Cr | 0 | 50 | 80 | 120 | 100 | 100 |
| 60 min. | Fe-Fe | 110 | 200 | 280 | 320 | 330 | 380 |
| | ZnCr-ZnCr | 0 | 100 | 120 | 160 | 170 | 180 |
| | Cr-Cr | 0 | 100 | 130 | 190 | 210 | 220 |
| 24 hr. | Fe-Fe | 120 | 320 | 280 | 320 | 370 | 380 |
| | ZnCr-ZnCr | 30 | 180 | 120 | 170 | 210 | 210 |
| | Cr-Cr | 50 | 190 | 130 | 200 | 320 | 240 |

In sample No. 1 with Fe-Fe bolts and nuts, return torques were 40 (30 min.) 110 (60 min.), and 120 (24 hr.), respectively, and were, each, very small.

(120° C) to observe torque values (kg-cm) at this time and thereby to determine the stabilities to a high temperature.

Table III

| Time of being left standing (cure time) (normal room temperature 20° C) | Material of bolt-nut (bolt-nut) | Return torque after being left standing (kg-cm) (120° C) Sample No. | | | | | |
|---|---|---|---|---|---|---|---|
| | | 1 | 2 | 3 | 4 | 5 | 6 |
| 24 hours | Fe-Fe | 80 | 80 | 220 | 240 | 240 | 240 |

Moreover, in case of ZnCr-ZnCr, return torques were 0(30 min.), 0(60 min.), 30(24 hr.), and in case of Cr-Cr, they were 0(30 min.), 0(60 min.) and 50 (24 hr.), respectively. Thus, all of these values were extremely small. It can be said from this facts that sample No. 1 is inferior with respect to both curing rate and adhesive force, and especially, these values were extremely decreased in case of inert surfaces of ZnCr-ZnCr and It is obvious from Table III that samples No. 3 to 6 indicate large return torques (220 to 240), and that the polymer is stable in the circumstances of high temperature, while, samples No. 1 to 2 indicate small torque values (80) and a lack of stability at the high temperature.

[Water proof test for polymer]

The bolts and nuts made by iron (bolts having 10mmφ of diameter and 1.5 pich of screw) were used for test, samples No. 1 to 6 were coated on each screw part of the nuts, then, the bolts were fixed into the coated nuts by fingers (return torque were zero, respectively), after that, the bolts and nuts were left standing under normal room temperature (20° C) for 24 hours.

Thereafter, the bolts and nuts were put into warm water of 60° C for 1 month. Then, the bolts were returned by the same torque range to observe return torques (kg-cm) and to thereby determine water proof of polymer, respectively.

The results are set forth in Table IV.

Table IV

| Time of being left standing (curing time) (normal room temp. 20° C) | Immersing time in water (60° C) | Material of bolt-nut (bolt-nut) | Return Torque(kg-cm) room temp. 20° C Sample No. | | | | | |
|---|---|---|---|---|---|---|---|---|
| | | | 1 | 2 | 3 | 4 | 5 | 6 |
| 24 hours | 1 month | Fe-Fe | 110 | 120 | 210 | 310 | 360 | 360 |

On Table IV, samples No. 3 to 6 indicate larger return torque after being put in water (270 to 360). This indicates that the polymer is excellent in water proof. Samples No. 1 and 2 indicate smaller values (110 to 120). This means that the polymer is inferior in water proof.

[Weather-proof test of polymer]

Tests were carried out in the same manner as the water proof test mentioned above.

First of all, bolts and nuts made by iron were prepared, then, the samples No. 1 to 6 were coated on each screw part of nuts. The bolts were fixed into the coated nuts, and then, were exposed standing to the air for six months. Thereafter, the bolts were returned under a room temperature by the same torque range to observe the return torques (kg-cm) and to thereby determine the weather proof, respectively.

The results are set forth in Table V.

Table V

| Time of being left standing (cure time) (room temp. 20° C) | Exposing time in air | Material of bolt-nut (bolt-nut) | Return torque after being left standing (kg-cm) (normal room temp. 20° C) Sample No. | | | | | |
|---|---|---|---|---|---|---|---|---|
| | | | 1 | 2 | 3 | 4 | 5 | 6 |
| 24 hours | 6 months | Fe-Fe | 120 | 250 | 280 | 320 | 370 | 360 |

On Table V, samples No. 3 to 6 indicate larger return torques (280 to 360) even after being exposed standing for 6 months. The polymers are excellent in weather proof. But, samples No. 1 and 2 indicate smaller valves (120 to 250). This means that they are inferior in weather proof.

[Test for adhesive force with mating tools]

Mating tools were prepared, which were formed by an iron ring having a hole (6 mmφ) in the center (6 mm in diameter) and iron shaft to be engaged. (clearance: 0.02 mm, adhesive area: 2.82 cm$^2$).

The samples No. 1 to 6 were coated on said shafts, then, the shafts were inserted into the rings. The tools were left standing for 24 hours under a room temperature (20° C) for curing.

Thereafter, panching strength were observed at a normal room temperature with an Amuslar tester to determine adhesive forces, respectively.

The results of these tests are set forth in Table VI.

Table VI

| Time of being left standing (cure time) (normal room temp. 20° C) | Material of engaged testing tools (shaft-ring) | Press shearing adhesive force (kg-cm) (normal room temp. 20° C) Sample No. | | | | | |
|---|---|---|---|---|---|---|---|
| | | 1 | 2 | 3 | 4 | 5 | 6 |
| 24 hours | Fe-Fe | 110 | 290 | 190 | 230 | 290 | 310 |

It becomes apparent from Table VI that all samples (No. 2 to 6) except sample No. 1 are excellent in adhesive force.

[Poison test to the skin of human body]

As to the female workers contacting with aforementioned samples for about 4 hours a day, the influences on their hands and fingers were observed. This observation was made after 20 days from start of the working.

As the result of this, it is obvious that sample No. 2 caused a somewhat poisonous effect on their skins, while other samples did no cause any poisonous effect on them.

From the above facts, it becomes to apparent that all samples except sample No. 1 are harmless to the skin of the human body.

From above results of the tests, it is apparent that samples No. 3 to 6 indicated good results. Therefore, the compositions of this invention can be said to be anaerobically excellent compositions having advantages as follows, 1. it is speedy in curing rate and greater in adhesive force,
2. it is also speedy in curing rate and greater in adhesive force even to inert surface, and
3. the polymerization compounds after anaerobic curing are excellent in water proof qualities and weather proof and in stability even under the circumstances of a high temperature of 80° C or more,
4. it is harmless to the skin of the human body, etc.

I claim:
1. An anaerobically curable sealing composition comprising a polymerisable monomer and an organic peroxide, characterized in that said monomer is a mixture of the following monomers (A) and (B), the ratio of the amounts of which are:

Monomer (A) : 95 to 50 parts by weight,
Monomer (B) : 50 to 5 parts by weight.
monomer (A) having the general formula of

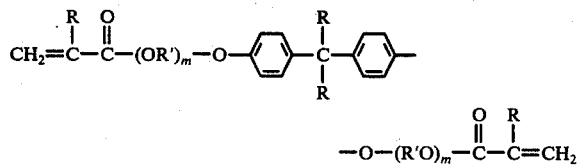

wherein, R represents hydrogen or alkyl radical having from 1 to 4 carbon atoms, R' represents alkylene radical having from 2 to 4 carbon atoms and $m$ represents an integer of from 2 to 8, monomer (B) having the general formula of

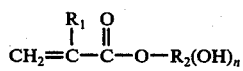

in which, $R_1$ indicates hydrogen or alkyl radical having from 1 to 4 carbon atoms, $R_2$ indicates $-CH_2-CH_3$, $-CH_2-CH_2-CH_3$ or

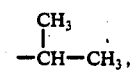

and $n$ indicates an integer of from 1 to 3.

2. The composition as claimed in claim 1 wherein said ratio is,
monomer (A) : 90 to 70 parts by weight,
monomer (B) : 30 to 10 parts by weight.

3. The composition as claimed in claim 1 wherein said monomer (B) is 2-hydroxy ethyl methacrylate.

4. The composition as claimed in claim 2 wherein the ratio of the amounts of said monomers (A) and (B) is,
monomer (A) : 90 to 70 parts by weight,
monomer (B) : 30 to 10 parts by weight.

5. The composition as claimed in claim 1 wherein a polymerization accelerator is added to said mixture of monomers (A) and (B).

6. The composition as claimed in claim 5 wherein said polymerization accelerator is one or more substances selected from the group consisting of ortho-sulfo benzoic imide, 1,2,3,4 - tetrahydroquinoline, and dextrin.

7. The composition as claimed in claim 1 wherein an agent for increasing adhesive force is added to said mixture of monomers (A) and (B).

8. The composition as claimed in claim 7 wherein said agent for increasing adhesive force is acrylic acid.

* * * * *